United States Patent Office 3,481,254
Patented Dec. 2, 1969

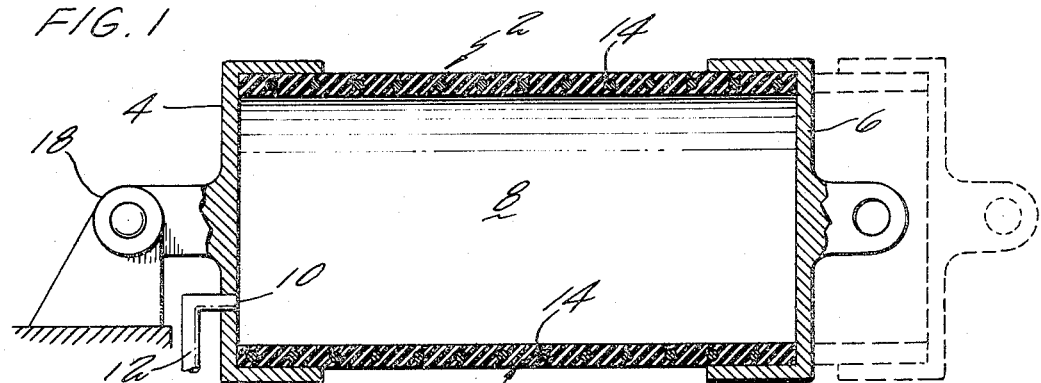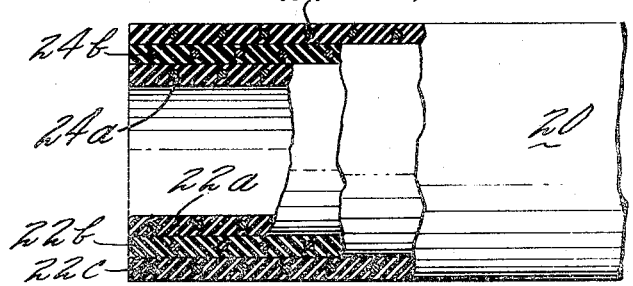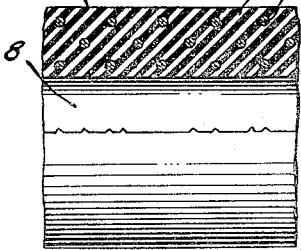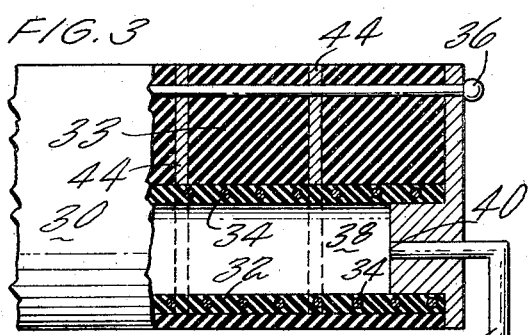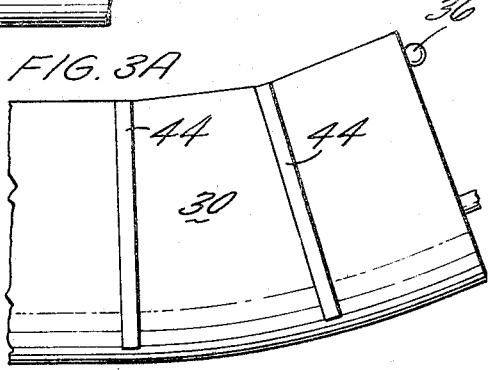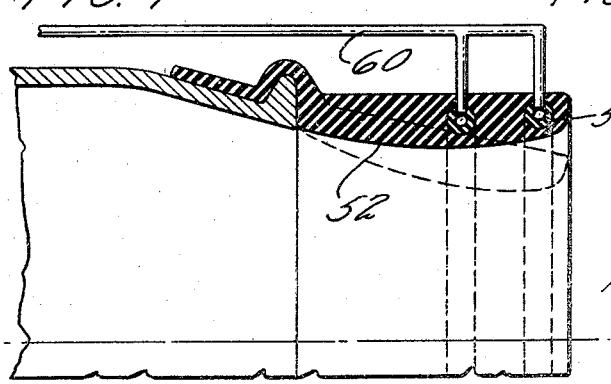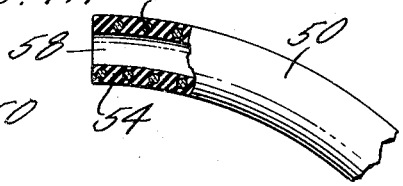

3,481,254
COMPOSITE STRUCTURE
Arthur E. Wetherbee, Jr., Newington, Conn., assignor to United Aircraft Corporation, East Hartford, Conn., a corporation of Delaware
Filed Aug. 14, 1967, Ser. No. 660,274
Int. Cl. F01b *19/04;* F16l *11/08, 11/12*
U.S. Cl. 92—92                                10 Claims

ABSTRACT OF THE DISCLOSURE

An anisotropically extensible tubular composite structure comprised of an elastomeric material in which a filament is helically wound and imbedded in the elastomeric material. The elastomeric material permits the structure to expand and contract and the filament determines the direction of this expansion or contraction.

BACKGROUND OF THE INVENTION

This invention relates to an anisotropically extensible composite structure. The invention is more particularly concerned with a composite structure that can expand or contract in preferred directions, movement in any other direction being substantially prevented.

While the prior art discloses structures of similar construction, most of this art fails to disclose an integral combination of an elastomeric and helically wound filament. Further, most of these constructions are directed at a reinforced structure with elongation or extension in all directions being substantially prohibited. This invention discloses a scheme which permits movement in a preferred direction and prevents movement in any other direction. In one embodiment preferred extensibility is obtained by providing a composite structure which is stiff in the radial or hoop directions and is flexible in the axial direction. Other embodiments provide composite structures which are adapted to provide either curvilinear movement or radial movement.

The structure disclosed herein is a novel composite structure which is readily adaptable to many applications, the field of actuators being a typical illustration. Further, any structure which evolves from the teaching contained herein would be one which is light, of simple construction and inexpensive.

SUMMARY OF THE INVENTION

It is a primary object of this invention to provide a structure which is extensible in a preferred direction while being substantially stiff in all other directions.

The present invention provides a structure comprised of an elastomer material and a filament helically wound and imbedded in the elastomeric material. The elastomeric material and the filament form what is herein called the composite structure. The composite structure disclosed herein is adapted principally for three types of movement, that is, axial or longitudinal expansion and contraction, curvilinear or two-plane expansion and contraction and finally radial expansion and contraction.

To cause the composite structure to expand and contract, the structure is normally exposed to a fluid under pressure, this pressurized fluid being directed to an internal cavity within the composite structure, and in response to this pressure, the composite structure either expands or contracts. The elastomeric material is the member of the composite structure which actually permits this movement while the direction of the movement is governed by the helically wound filament. In other words, if the filament is wound so that the composite structure is stiff in the hoop or radial direction, then the composite structure will move longitudinally. If the composite structure is restrained on one side, the composite structure will both bend and move longitudinally, that is, a structure is provided that will bend around a corner. Similarly, if the composite structure is in the form of a toroidal tube, a radially expandable and contractable structure is provided. Common, however, to any of these different composite structure configurations is that the direction of the expansion or contraction is generally in a direction parallel to the axis assumed by the filament, this axis generally being parallel to the tube axis.

It should be clear from the foregoing that the integral elastomeric and filament composite structure has different properties than the individual elastomer and filament properties and that the structure provided is a novel structure readily adaptable to many applications.

BRIEF DESCRIPTION OF THE DRAWINGS

FIGURE 1 is a fragmentary sectional schematic showing the device of the invention in its stationary state and longitudinally expanded position.

FIGURE 1A' is a fragmentary sectional schematic showing the multilayer construction of the present invention.

FIGURE 2 is a fragmentary sectional schematic of a thick-walled tube showing the device of the invention.

FIGURE 3 is a fragmentary sectional schematic showing the device of the invention in its stationary state.

FIGURE 3A is a fragmentary sectional schematic showing the device of the invention in its curvilinearly expanded position.

FIGURE 4 is a fragmentary sectional schematic showing the device of the invention in conjunction with a radially expandable duct.

FIGURE 4A is a fragmentary sectional showing of the device of the invention.

DESCRIPTION OF THE PREFERRED EMBODIMENTS

Referring first to FIGURE 1 for a description of an illustrated embodiment of the invention, cylindrical body 2 has a pair of caps 4 and 6 connected to its ends. Caps 4 and 6 are axially spaced and with cylindrical body 2 form sealed internal cavity 8 for accommodating a pressurized fluid. This internal pressurized fluid, which may be either hydraulic or pneumatic, is supplied from an external source, not shown, to cavity 8 through pipe 12 and passage 10.

Cylindrical body 2 is formed of an elastomeric material, natural rubber, neoprene and urethane being typical examples. As shown in FIGURE 1, imbedded in this elastomeric material is filament 14, filament 14 being wound helically, normally with a small helix angle, around cylindrical body 2. It is pointed out that it is not necessary to wind filament 14 helically around cylindrical body 2, it being possible to obtain the same results by forming filament 14 in a ring construction and placing the rings concentrically about cylindrical body 2.

Typically filament 14 is of a small diameter, being on the order of .0003–.0040 inch in diameter, and has fragile characteristics as an individual component. However, since the filament is imbedded in the elastomeric material by any known process, which is not part of the present invention, the wound cylindrical body emerges as a composite structure 16. It should be noted that the properties of this composite structure are governed by the combination of the elastomeric material and filament 14. More specifically, when pressure is supplied to cavity 8, the elastomeric material will expand; however, the direction of this expansion is governed by how filament 14 is placed around cylindrical body 2. In FIGURE 1, filament 14 is hoop wound with a small helix angle around cylindrical body 2. Hence, cylindrical body 2 is stiff in the hoop or radial direction and flexible or extensible in the axial direction. Therefore, when pressure is supplied to the construction shown in FIGURE 1, composite structure 16 will extend axially and assume the position indicated by the dotted lines. As shown, composite structure 16 is fixed at one end as at 18; however, it is to be understood that it may be free at both ends or fixed at both ends.

FIGURE 2 illustrates the device of the invention in a multi-layered filament, thick-walled tube construction. In this type of construction the elastomeric material does not provide a large degree of radial stiffness between successive radial outward filament layers with the result that radial transmission of stress tends to be poor and there is a concentration of stress in the inner filaments when the tube is exposed to internal pressure. This results in a tube construction wherein the limiting pressure member is the inner filament layer. A strong tube construction, therefore, is not achieved by increasing the tube wall thickness, rather it is obtained by the use of successive layers of filaments having progressively greater modulus of elasticity. Referring to FIGURE 2, the thick-walled tube is indicated by the numeral 20. The tube is formed by an elastomeric material 22a, and imbedded in elastomeric material 22a is a first filament layer 24a. This filament layer should have the characteristics of being strong and capable of large elongation, nylon being a typical material. The next radially outward filament layer 24b, which is also imbedded in elastomeric material 22b, would have a larger modulus of elasticity but less elongation capability, glass being a typical material. As a result of using filaments with different properties in the foregoing manner, each successive layer provides support for the preceding layer. Thus, the stress distribution can be altered and made compatible with the strength of the filament material, and the limits on internal pressure which such a tube can carry are greatly increased.

FIGURE 3 shows a composite structure construction which is extensible axially and can also bend or flex. As shown cylindrical body 30 is formed of an elastomeric material and filament 34 is hoop wound with a small helix angle and imbedded in the elastomeric material 32. The composite structure of FIGURE 3 is very similar to that of FIGURE 1 with the exception that flexure restraining cable 36 is inserted and extends through elastomer collar 33. As noted hereinbefore, a hoop wound filament elastomer tube construction is stiff and strong in the radial direction but flexible axially. Therefore, with the addition of flexure restraint 36, when pressurized fluid is supplied to cavity 38 through passage 40 and pipe 42 from an external source, not shown, the cylindrical body 30 will extend axially and bend or flex, assuming the position shown in FIGURE 3a. To increase the stability characteristics of the composite structure and to reduce the tendency of twisting, ribs 44 are provided. As shown, ribs 44 are connected to collar 33 and elastomeric tube 38. The construction shown herein is most suitable for two dimensional applications in which bending effectively occurs in one plane.

FIGURES 4 and 4a show a composite structure, that is, an integral filament elastomeric material body, in the form of a toroidal tube. As shown in the embodiment, a series of hoop wound filament elastomeric toroidal tubes 50 are positioned around a radially movable circumferential wall 52. Toroidal tubes 50 are formed of elastomeric material 54 and filament 56 with an internal cavity 58. A characteristic of this type tube is that it extends significantly in length, that is toroid diameter, without altering significantly in tube diameter. Therefore, when pressurized fluid is supplied through pipe 60 to cavity 58, the expansion or contraction of tube 50 will cause circumferential wall 52 to move radially inward or outward and thereby vary the area enclosed by circumferential wall 52 as shown by the dotted lines in FIGURE 4.

What is claimed is:

1. An anisotropically extensible composite structure comprising:
    a body of elastomeric material, said body having a sealed interior cavity;
    a plurality of substantially inextensible filaments imbedded in said elastomeric material in a plurality of layers, each layer within the elastomeric material being radially spaced from one another, each individual filament being axially offset from the filament in the adjacent layer, the layers of filaments and elastomeric material forming the composite structure, the elastomeric material being the sole expansible and contractible member of the composite structure, the layers of filaments radially constraining the elastomeric material and causing the elastomeric material to expand and contract in a preferential direction, said direction being generally parallel to the axis assumed by the filament layers, this direction being substantially parallel to the axis of the body; and
    means in said body for supplying fluid under pressure to said interior cavity for causing the composite structure to extend and contact in the preferred direction.

2. An anisotropically extensible composite structure comprising:
    a cylindrical body of elastomeric material, said body saving a sealed interior cavity;
    a plurality of substantially inextensible filaments imbedded in said elastomeric material in a plurality of layers, each layer within the elastomeric material being radially spaced from one another, each individual filament being axially offset from the filament in the adjacent layer, the layers of filaments and elastomeric materials forming the composite structure, the elastomeric material being the sole deformable member of the composite structure, said layers of filaments radially constraining the elastomeric material such as to permit axial expansion and contraction of the composite structure when said body is unrestrained and axial and curvilinear expansion and contraction when at least one side of said body is restrained; and
    means in said body for supplying fluid under pressure to said interior cavity for causing movement of said composite structure.

3. An anisotropically extensible composite structure comprising:
    a cylindrical body of elastomeric material, said body having a sealed inner cavity for accommodating a pressurized fluid;
    a plurality of multi-layered filaments imbedded in said elastomeric material the filaments and elastomeric material forming the composite structure, each filament layer being radially spaced from one another, each individual filament being axially offset from the filament in the adjacent layer, the elastomeric material being the sole extensible and contractible member and permitting expansion and contraction of said composite structure in response to said pressurized fluid, the direction of said expansion and contraction being determined by said filament layers, the direction of said expansion and contraction being generally parallel to the axis assumed by the filaments, this axis being substantially parallel to the axis of said body; and
    means in said body for supplying fluid under pressure to said inner cavity.

4. A longitudinally flexible composite structure comprising:
    a tubular main body of an elastomeric material;
    a plurality of layers of filaments imbedded in said elastomeric material, the filament layers and elastomeric material forming the composite structure, the elastomeric material being the sole deformable member, said filament layers being spaced radially from one another, each individual filament being axially offset from the filament in the adjacent layer, and permitting longitudinal movement of the elastomeric material while substantially preventing movement of the elastomeric material in any other direction;

means for enclosing the ends of the main body, said means and said main body cooperating to form a sealed inner cavity within said main body; and means in said body for supplying fluid under pressure to said inner cavity for causing movement of said composite structure.

5. In a longitudinally flexible composite structure as in claim 4 wherein:

the plurality of filament layers extend from the inner diameter to the outer diameter of said main body, and at least one radially outward layer having a higher modulus of elasticity than the layer thereunder.

6. A curvilinear flexible composite structure comprising:

a tubular main body of an elastomeric material;

an asymmetrical axial restraint member attached to one wal of said main body;

a plurality of layers of substantially inextensible filaments imbedded in said elastomeric material, each filament layer within the elastomeric material being radially spaced from one another, each individual filament being axially offset from the filament in the adjacent layer, the filament layers and elastomeric material forming the composite structure, the elastomeric material being the sole expansible and contractible member at the composite structure, said filament layers and said axial restraint cooperating and permitting longitudinal and curvilinear movement of said composite structure while substantially preventing radial expansion of said structure;

means for enclosing the ends of the main body, said means and said main body cooperating to form a sealed inner cavity within said main body; and means in said body for supplying fluid under pressure to said inner cavity for causing movement of said composite structure.

7. In a curvilinear flexible composite structure as in claim 6 wherein:

the plurality of filament layers extend from the inner diameter to the outer diameter of said main body, and at least one radially outward layer having a higher modulus of elasticity than the layer thereunder.

8. A radially extensible composite structure comprising:

a ring of elastomeric material;

a toroidal tube of elastomeric material imbedded in said ring;

a plurality of layers of substantially inextensible filaments imbedded in the elastomeric material of said toroidal tube, each filament layer being radially spaced from one another, each individual filament being axially offset from the filament in the adjacent layer, the layers of filaments radially constraining the elastomeric material of said toroidal tube, said ring, toroidal tube, and filament layers forming the composit structure; and means in said tube for supplying fluid under pressure to the internal portion of said toroidal tube for moving the composite structure radially inward and outward.

9. A radially extensible composite structure as in claim 8 wherein:

a plurality of filament layers extend from the inner diameter to the outer diameter of said tube, and at least one radially outward layer having a higher modulus of elasticity than the layer thereunder.

10. A radially extensible composite structure as in claim 8 wherein:

said filament is wound concentrically with respect to the axis of said toroidal tube.

References Cited

UNITED STATES PATENTS

| | | | |
|---|---|---|---|
| 1,184,371 | 5/1916 | Myers | 92—92 |
| 1,205,984 | 11/1916 | Forsyth | 138—133 |
| 1,685,709 | 9/1928 | Lee | 92—94 X |
| 1,878,885 | 9/1932 | Pahl | 138—132 X |
| 2,363,967 | 11/1944 | Jasper | 138—140 |
| 2,642,091 | 6/1953 | Morin | 92—90 |
| 2,767,741 | 10/1956 | Knowland et al. | 138—132 |
| 3,075,624 | 1/1963 | Fawick | 92—92 X |
| 3,216,876 | 11/1965 | Tyhurst | 156—173 |
| 3,357,456 | 12/1967 | Grawey et al. | 138—138 X |

MARTIN P. SCHWADRON, Primary Examiner

IRWIN C. COHEN, Assistant Examiner

U.S. Cl. X.R.

92—94; 138—132, 137